United States Patent
Jouko

(12) 
(10) Patent No.: US 6,742,954 B2
(45) Date of Patent: Jun. 1, 2004

(54) LOCKING SYSTEM FOR A ROTATING JOINT

(75) Inventor: Hyytiäinen Jouko, Iampere (FI)

(73) Assignee: Timberjack Oy, Tampere (FI)

( * ) Notice: Subject to any disclaimer, the term of this patent is extended or adjusted under 35 U.S.C. 154(b) by 88 days.

(21) Appl. No.: 10/221,096

(22) PCT Filed: Mar. 8, 2001

(86) PCT No.: PCT/FI01/00226

§ 371 (c)(1),
(2), (4) Date: Sep. 6, 2002

(87) PCT Pub. No.: WO01/66407

PCT Pub. Date: Sep. 13, 2001

(65) Prior Publication Data

US 2003/0032488 A1 Feb. 13, 2003

(30) Foreign Application Priority Data

Mar. 10, 2000 (FI) ............................................. 20000548

(51) Int. Cl.⁷ ............................................... F16D 1/12
(52) U.S. Cl. ............................. 403/38; 403/31; 403/34; 403/39; 56/15.8; 56/DIG. 10
(58) Field of Search ................................ 403/31, 34, 1, 403/38, 39, 91, 97, 119, 161, 359.1, 359.5; 280/174; 92/129, 136; 56/14.7, 15.7, 15.8, DIG. 10; 192/85 A, 69.8; 172/272, 677, 679, 684.5

(56) References Cited

U.S. PATENT DOCUMENTS

| | | | | |
|---|---|---|---|---|
| 2,921,773 A | * | 1/1960 | Hoelzer ...................... | 254/129 |
| 3,680,890 A | | 8/1972 | Magown, Sr. et al. ...... | 280/432 |
| 4,079,955 A | * | 3/1978 | Thorpe et al. .............. | 280/474 |
| 4,116,459 A | | 9/1978 | Kreitzberg .................. | 280/474 |
| 4,215,874 A | | 8/1980 | Schoelkopf ................. | 280/474 |
| 4,235,308 A | | 11/1980 | Davis .......................... | 187/9 R |
| 5,090,509 A | | 2/1992 | Lippert ....................... | 180/140 |
| 5,806,870 A | | 9/1998 | Hull et al. ................... | 280/400 |
| 5,820,288 A | * | 10/1998 | Cole ............................ | 403/97 |

FOREIGN PATENT DOCUMENTS

| | | | | |
|---|---|---|---|---|
| FI | 998/68 | | 4/1968 | ........... B62D/53/02 |
| GB | 2258437 | | 2/1993 | ........... B62D/53/02 |
| GB | 2 258 437 | * | 2/1993 | ........... B62D/53/02 |
| SE | 509 907 | | 3/1999 | |
| SU | 1320112 | | 6/1987 | ........... B62D/53/02 |
| SU | 1320112 | * | 9/1987 | ........... B62D/53/02 |

OTHER PUBLICATIONS

International Search Report, Form PCT/ISA/210, as issued by Swedish Patent Office in Connection with PCT Appl. No. PCT/FI01/00226.
International Preliminary Examination Report, Form PCT/IPEA/409, as issued by the Swedish Patent Office in connection with PCT Appl. No. PCT/FI01/00226.
Official Action as issued by the Swedish Patent Ofiice in connection with FI Priority Application 20000548.

* cited by examiner

Primary Examiner—Lynne H. Browne
Assistant Examiner—Michael P. Ferguson
(74) Attorney, Agent, or Firm—Quarles & Brady LLP

(57) ABSTRACT

The present invention relates to a locking system for a rotating joint. In the device, the locking system (L) comprises a rigid locking means (12) movable in the axial direction (X1), provided with a first cogging (13) which can be moved for locking with the locking means (12) in a contact with a second cogging (14), to transmit the rotational movement, wherein said coggings (13, 14) are, for releasing the cogging, designed in such a way that a force effect releasing the locking is formed between them, and a third cogging (16) which is, during the locking, in a contact with a fourth cogging, to transmit the rotational motion, as well as a sealing element (21) for forming at least one closed hydraulic space (24) with a varying volume between the locking means (12) and the sealing element (21), wherein the locking means (12) is arranged to be moved for the locking and to be kept in the locking by the effect of a pressurized medium.

10 Claims, 3 Drawing Sheets

LOCKING SYSTEM FOR A ROTATING JOINT

BACKGROUND OF THE INVENTION

The invention relates to a locking system for a rotating joint according to the preamble of the appended claim 1.

For harvesting, working machines are known which move on a terrain by means of wheels. These include a harvester in which a harvesting device is provided at the end of a boom assembly, a so-called harvester head for cutting and felling a tree stem and sawing it to pieces of desired length. The sawn tree stems are collected with a loading apparatus, or a forwarder equipped with a grapple, and are transported in its load space. For example, a harvester working machine with articulated steering comprises two frame parts which are arranged, by means of a joint, to swivel in relation to each other around a vertical axis. A swivel base is mounted on the first frame part to swivel around a vertical axis and is equipped with a cabin and a boom assembly, a harvester head being mounted at the end of the boom assembly. The boom assembly can also be mounted on a separate swivel base, and the cabin can be stationary. The second frame is equipped with a power source and a pair of wheels. The first frame part normally comprises one or two pairs of wheels.

Another known forwarder, movable by means of wheels, is disclosed in Swedish patent publication 509 907 and comprises two frame parts connected to each other by means of a joint. One of the frame parts is equipped with a load space where the tree stems are collected from the ground by means of a loader, its boom assembly being normally also mounted to the front part of the second frame part. The first frame part is equipped with a cabin and a power source for the working machine. For improving movability on a terrain, the frame parts are arranged to be articulated by means of a rotating joint with respect to each other around an axis in the longitudinal direction of the frame. The turning movement is normally limited. In addition to this, the working machine is controlled by steering the frame parts around a vertical axis by means of cylinders.

At present, so-called combined machines are also known, combining the functions of a harvester and a forwarder. In one example, the working machine comprises two frame parts which can be swivelled around a longitudinal and vertical axis. Thus, the first frame part is equipped with a boom assembly and a cabin, for example on a joint swivel base, as well as a power source, and the second frame part is equipped with a space for the load. The second frame part is normally supported by two separate wheel shafts.

To maintain stability of the working machine, it must be possible to lock the rotating joint to prevent swivelling of the frame parts. Particularly when the boom assembly is used, for example upon loading, cutting and delimbing, the position is locked, wherein the weight of the second frame part is also utilized as a counterweight. The presented rotating joint normally comprises a circumferential bearing which is a single-row filling slot type bearing. The outer race and the inner race of the bearing are coupled to different frame parts. The frame part may also be equipped with a transverse joint, by means of which the rotating joint and the frame part swivel.

As known, the rotating joint is also equipped with separate brake plates which are locked by means of brake cylinders. The brake plates and the brake cylinders become large, and they must be placed outside the rotating joint, which considerably increases the size and weight of the rotating joint. Because of the mounting and size of the brake plate, rotation is often possible within allowed limits only, which restricts the movement of the frame parts. The joint can be equipped with e.g. an arch-like cogging where the cogs extend in the axial direction. The rotation movement is locked with a locking means movable in the radial movement and set in the cogging. For example, a separate cylinder structure for moving the locking means, operated by a pressurized medium, is often also large in size. However, particularly the locking force of a single locking means also causes an unnecessary and uneven torque between the outer and inner races of the circumferential bearing, stressing the circumferential bearing. Consequently, prior art lockings increase the size of joints and the stresses.

BRIEF SUMMARY OF THE INVENTION

It is an aim of the present invention to eliminate the above-mentioned problems. To attain this purpose, the locking system according to the invention is primarily characterized in what will be presented in the characterizing part of the appended claim 1.

Using the invention, a considerably integrated and compact construction is achieved, wherein it can also be applied in various rotating joints which also comprise joints in the transverse direction. The locking system also makes it possible to rotate the frame parts with respect to each other without limits. A particular advantage is achieved in that in the locked position, the circumferential bearing of the rotating joint is not subjected to forces caused by the locking. In a preferred embodiment of the invention, another particular advantage is a large annular hydraulic space for the pressurized medium, wherein the required control pressures for maintaining even great locking forces can be kept reasonable. The number of separate hydraulic spaces can also be easily increased. One advantage is that external energy and the pressurized medium are only used when necessary for locking and for maintaining the locking, and that the locking will be automatically released, thanks to the design of the cogging. Another advantage is that the rest of the cogging can also be arranged in such a way that it will not cause locking or releasing forces, wherein the locking system can be easily moved. The hydraulic space and the cogging can be made annular, wherein a balanced loading and functionality of the rotating joint are achieved in all the rotating positions. Particularly the cylindrical, centrally placed parts of the locking system are easy to manufacture e.g. by lathing.

BRIEF DESCRIPTION OF THE DRAWINGS

In the following, the invention will be described in more detail by using as an example a locking system according to an advantageous embodiment with reference to the appended drawings, in which.

DETAILED DESCRIPTION OF THE PREFERRED EMBODIMENT

Figure 1:
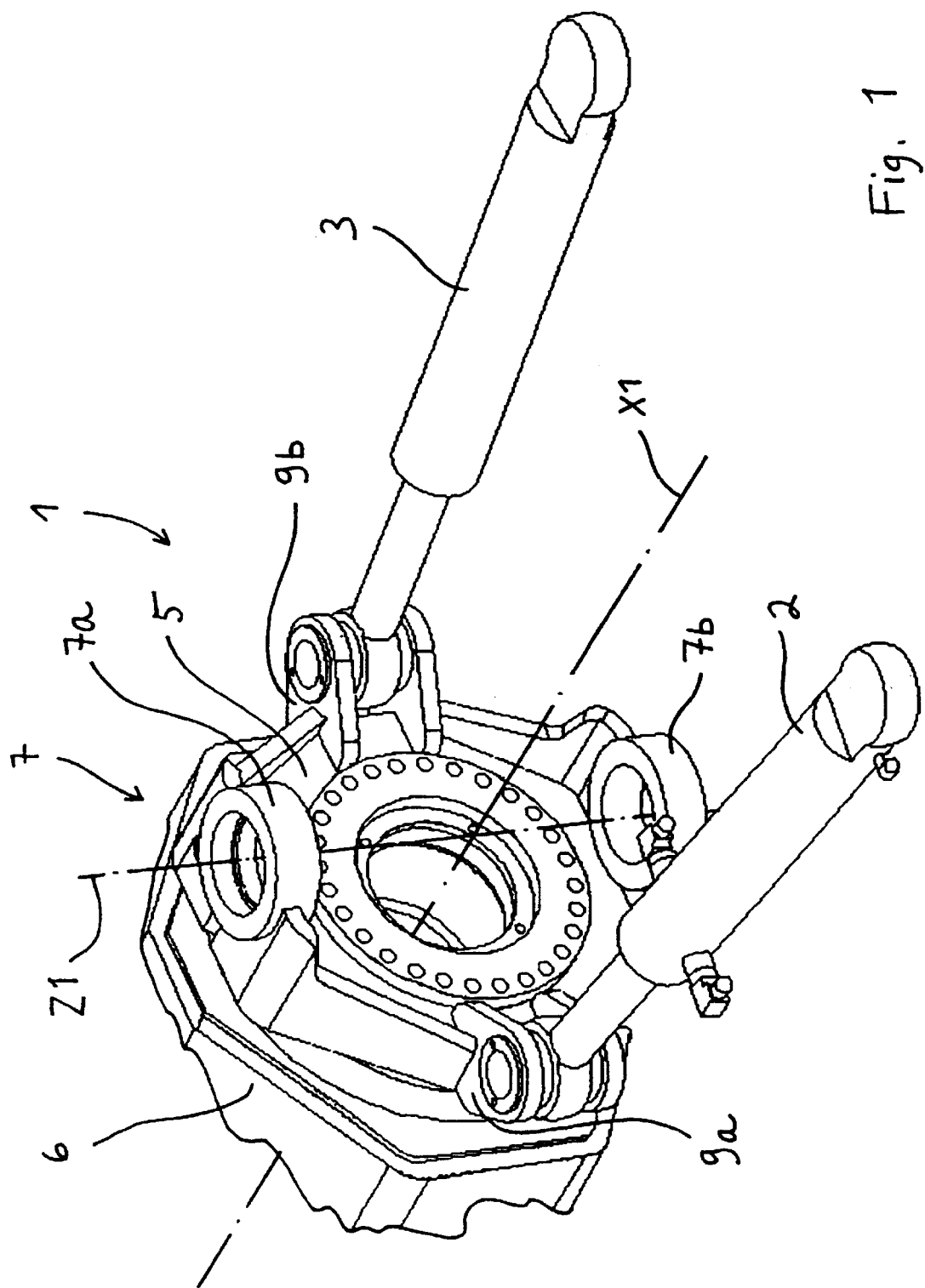
FIG. 1 shows a perspective view of a rotating joint in a working machine, applied in connection with a turning joint and its control cylinders.

In FIG. 1, the rotating joint 1 is shown in an application in connection with a turning joint 7 between the frame parts 5 and 6 of a working machine. The rotating joint 1 is arranged between the first frame part, which in this description will also be called front part 5, and the second frame part, which in this description will also be called rear part 6, the frame parts being rotatable with respect to each other around an axis X1. The frame part 6 is shown in a cut view. The axis X1 is normally parallel with the longitudinal axis of the working machine, when the frame parts 5 and 6 are mounted one after the other in the working machine, wherein the frame parts are allowed to rotate around the longitudinal axis. The front frame part of the working machine can be either frame part 5 or 6. The first frame part 5 of the working machine is also provided with a joint 7, by means of which the joint 1 and the rest of the frame part 5 can be rotated with respect to each other around a vertical axis Z1. The joint 7 is utilized in the frame steering of the working machine. For this purpose, the joint 7 comprises two lugs 7a and 7b provided at a distance from each other for bearing. The lugs are preferably placed on different sides of the axis X1. The axis Z1 preferably intersects the axis X1. It is obvious that the joint 7 can also be totally eliminated, wherein the frame parts 5 and 6 rotate with respect to each other only. Alternatively, the frame part 6 can be provided with a joint 7 of the presented type. It is also possible that both of the frame parts are equipped with such a joint. Furthermore, the joint 7 may comprise one cylinder only.

Lugs 9a and 9b are provided symmetrically on different sides of the axis Z1, at a distance from each other. The first end of a first rotating cylinder 2 is mounted by means of a joint to the lug 9a, and the first end of a second rotating cylinder 3 is mounted by means of a joint to the lug 9b. The second ends of the cylinders 2 and 3 are mounted by means of joints to that part of the first frame part 5 which is mounted to the joint 7. By controlling the linear movement of the cylinders, the frame parts are rotated with respect to each other around the axis Z1, for example for frame steering. The cylinders are rotated at both ends around a substantially vertical axis.

Figure 2:
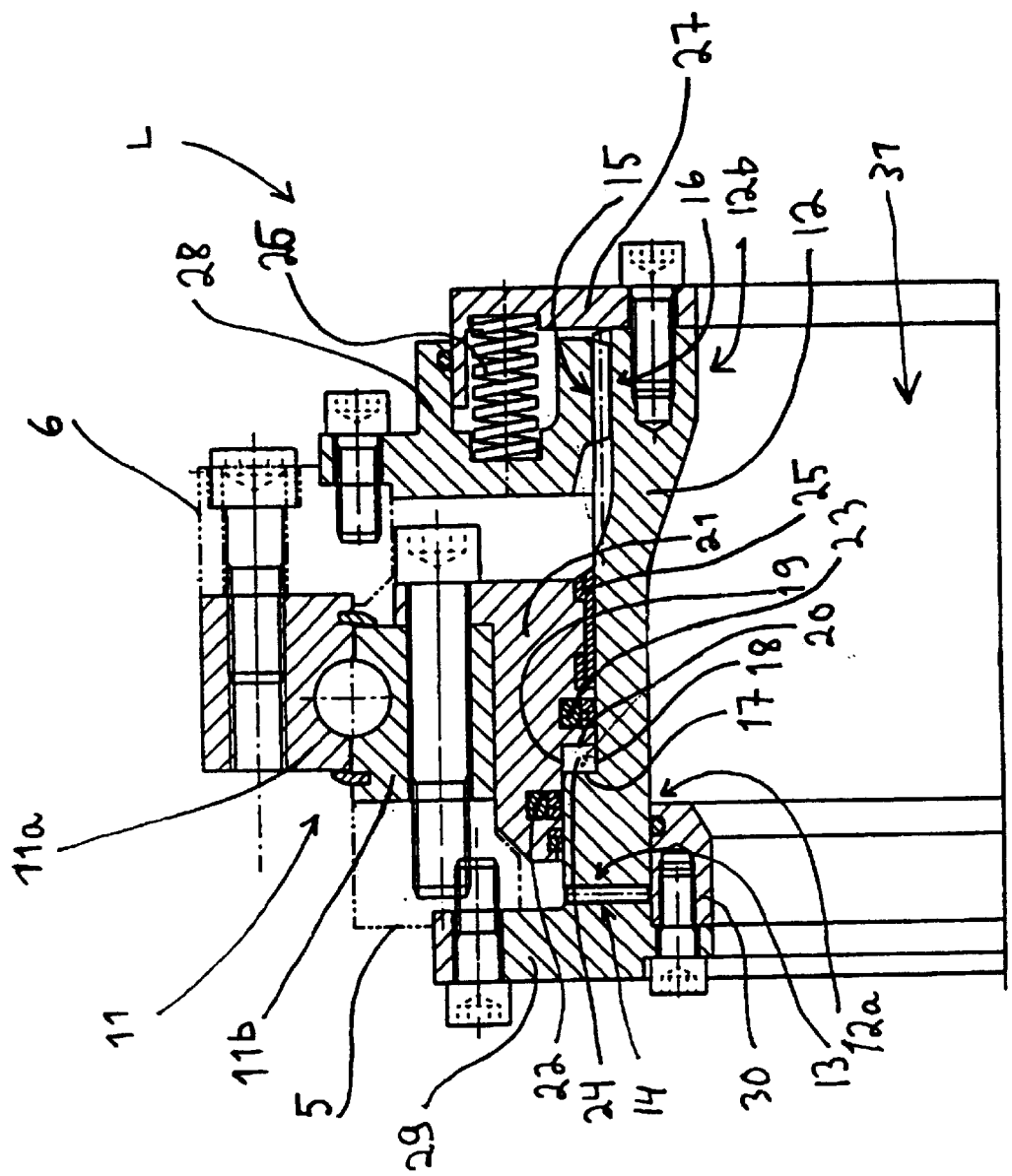
FIG. 2 shows the rotating joint of FIG. 1 in a cross-section seen from the side, to illustrate a locking system according to an advantageous embodiment of the invention.

A protected bearing according to FIG. 2 is arranged between the front part 5 and the rear part 6, allowing them to rotate separately around the axis X1. By means of the bearing, the disconnection of the front part and the frame part from each other in the direction of the axis X1 is also prevented. The bearing is preferably implemented by means of a circumferential filling slot type bearing, known as such, which is centrally placed on the axis X1 and whose outer race is connected to the rear part 6 and whose inner race is connected to the front part 5. A locking system L according to the invention is also arranged inside the rotating joint 1, wherein the rotation of the front part 5 and the rear part 6 with respect to each other is also prevented, if necessary. In the locked position, the rotational motion is transferred between the frame parts. The rotating joint 1 is normally locked during loading of the working machine and during use of the boom assembly, and is free during driving.

FIG. 2 shows the locking system L in a cross-sectional view cut along the axes X1 and Z1 of FIG. 1. Only the necessary parts of the frame parts 5 and 6 are illustrated. In the presented embodiment, the locking system L and the circumferential bearing 11 are rotationally symmetrical pieces which are centrally placed on the axis X1. The locking system L is shown in the locked position, wherein a locking means 12 is moved to the left and wherein a first cogging 13 and a second cogging 14 are in contact with each other. The circumferential bearing 11 comprises an outer race 11a and an inner race 11b. The inner race 11b is connected, preferably by means of a screw fastening, to the front part 5 which is illustrated with a simple line of dots and dashes. The outer race 11a is coupled to the rear part 6 which is illustrated with a simple line of dots and dashes.

The locking system L comprises a cogging 14 which is rotatable with the front part 5 around the axis X1 and comprises a circumferential front surface facing the rear part 6, having a substantially standard width, and being equipped with radial cogs. The locking system L comprises an inner cogging 15 which is rotatable with the rear part 6 around the axis X1 and comprises a circumferential front surface facing the axis X1, having a substantially standard width, and being equipped with axial cogs. The locking system L also comprises a rigid locking means 12 which is movable in the direction of the axis X1 and is arranged in functional contact with the coggings 14 and 15, wherein it transfers the rotational motion between the front part 5 and the rear part 6, simultaneously rotating with the rear part 6.

The locking means 12 comprises a cogging 13 which is arranged at its first end 12a and comprises a circumferential front surface facing the cogging 14, having a substantially standard width, and being equipped with radial cogs. The coggings 13 and 14, as a concentric pair of cogged wheels, are interlocked in a contact that transmits rotational motion and power, wherein the rotational motion between the locking means 12 and the front part 5 is prevented. When the locking means 12 is off the contact, the reciprocal rotational motion is possible.

The locking means 12 comprises an outer cogging 16 which is arranged at its second end 12b and comprises a circumferential front surface extending radially from the axis X1, and being equipped with axial cogs formed by e.g. a grooving. The coggings 15 and 16, as a concentric and cylindrical pair of inner cogged wheels, are arranged to continuously remain in a contact that transfers rotational motion, wherein the rotational motion between the locking means 12 and the rear part 6 is always prevented. The cogging 16 is arranged to slide back and forth in the cogging 15 in the direction of the axis X1 to allow movement of the locking means 12.

The locking means 12 is preferably formed a tubular, rotationally symmetrical piece, and the coggings are preferably annular, circumferential or circular, wherein the unlimited rotational motion and locking of the frame parts is possible in all the rotational positions. When the rotating joint 1 is locked, the rigid locking means 12 transmits the rotating torque effective between the frame parts of the working machine.

The radial outer surface 18 of the locking means 12 is also provided with a circumferential axial front surface 17. By means of a force exerted on the front surface 17, the locking means 12 is moved towards the cogging 14 in the direction of the axis X1. The force is produced by means of a pressure effect by the pressurized medium on the area of the surface 17. By the effect of the force, the rotating joint 1 is locked, and upon releasing the force, the rotating joint 1 is released. On both sides of the front surface 17, the locking means 12 is provided with cylindrical outer sealing surfaces on the outer surface 18. Said surfaces are packed towards the cylindrical inner surface 19 which is fitted in a sealing element 21 rotating with the front part 5 and the inner race 11b. Grooves formed on the surface 19, on both sides of the front surfaces 17 and 20, are provided with sealings 22 and 23. The groove on the surface 19 is also provided with a bearing 25, such as a slide bearing, to connect the means 12 and 21 by a bearing. The inner surface 19 of the sealing element 21 is also provided with a circumferential axial front surface 20. The front surfaces 20 and 17 face each other. The outer surface 18 and the inner surface 19 also face each other. The area of the surface 20 is also subjected to the above-mentioned pressure effect by the pressurized medium. However, the surface 20 and the sealing element 21 are not allowed to move in the direction of the axis X1 with respect to the inner race 11b or the cogging 15. The surface 20 is thus subjected to a counterforce for the force effective on the surface 17 and moving the locking means 12 in the axial direction. Said counterforce is effective by means of the inner race 11b on the front part 5. Similarly, the force effective in the coggings 13 and 14 is exerted by means of a part 29 on the front part 5, wherein a considerable advantage is that no loading forces caused by the locking are effective between the inner race 11b and the outer race 11a.

The outer surface 18, the inner surface 19 and the front surfaces 17 and 20 form an annular hydraulic space 24 for a pressurized medium. The volume of the hydraulic space 24 varies when the locking means 12 is moved, wherein the locking means 12 is used as a kind of a piston and a piston rod, and the sealing element 21 is used as a kind of a cylinder. The distance between the surfaces 17 and 20 in the axial direction is greater than the length of the interlocked coggings 13 and 14 in the locked position of the locking means 12. It is thus possible to release the locking, and the coggings do not keep rubbing each other. At the same time, the length of the cogging 16 is the respective measurement greater than the width of the cogging 15, to maintain the contact in the different positions of the locking means 12. The sealing element 21 is provided with at least one channel (not shown in the figures) for conveying pressurized medium to and from the hydraulic space 24. The pressurized medium is introduced to the channel for example by means of tubes or hoses.

The pressurized medium can be controlled by using valve means, known as such, wherein the pressure, volume flow and flowing direction of the pressurized medium can be controlled in a desired manner, for example by means of a hydraulic, electrically controlled control circuit. The control circuit can be arranged e.g. in connection with another control circuit in the working machine, wherein the operation can also be automatically controlled by means of the control system of the working machine. However, the dimensioning of the required pressure and the volume flow, and the control circuit for different situations and loadings will be obvious for anyone skilled in the art on the basis of the above description, wherein a mored detailed description will not be necessary. Similarly, the final dimensioning of the coggings, e.g. the more detailed selection the profiles, spaces, number and other parameters of the cogs and their testing for the operation of the locking system in different loading situations will be obvious for anyone skilled in the art on the basis of the description above.

The operation of the locking means 12 is arranged in the following way. When locked and when the front part 5 is being swivelled, the cogging 14 also rotates the cogging 13 and further, via the means 12 and the coggings 15 and 16, also the rear part 6. Due to the profile of the coggings 14 and 13, the locking means 12 is subjected to a force releasing the locking and being effective in the direction of the axis X1. This force is compensated by the force of the pressure effective in the hydraulic space 24. Due to the profile of the coggings 15 and 16, particularly friction forces are also effective between them, resisting the sliding of the locking means 12 in different directions. According to the invention, however, the profiles of the cogging are dimensioned so that the axial friction force caused is smaller than the above-mentioned releasing force. The cogging is preferably axial, wherein the means 12 is subjected to axial (X1) forces caused by the transmission of the rotational motion which are as small as possible. Thus, when the pressure effect of the hydraulic space 24 is removed (pressurized medium is discharged and the pressure space 24 becomes smaller), the locking means 12 is automatically moved by the effect of the releasing force and the locking is automatically released. The locking is returned by returning the pressure effect of the hydraulic space 24 (pressurized medium is introduced and the hydraulic space 24 is expanded).

To secure the releasing of the locking and to move the coggings 13 and 14 farther from each other, a pressure spring 26 is used. The spring 26 produces an axial force which moves the locking means 12. The spring 26 can be light in its structure, e.g. a coil spring, because it must only compensate the friction forces caused by the sealings 22, 23 and the bearing 25 as well as the friction force between the coggings 15 and 16. At its first end, the spring 26 is effective on a circumferential end part 27 which is fixed, preferably by screw fastening, to the locking means 12. At its second end, the spring 26 is supported to an annular spring suspension part 28 which is set around the locking means 12 and is also equipped with an inner cogging 15, e.g. by means of a grooving. The spring suspension part 28 is further mounted to the rear part 6, preferably by screw fastening. The cogging 14 is formed on an annular end part 29 which is further mounted to the rear part 5, preferably by screw fastening. To the end part 29 is mounted, preferably by a screw fastening, an annular collar part 30 extending inside the locking means 12 and packed against the same, to support the locking means 12. The sealing element 21 is placed around the locking means 12 and centrally inside the circumferential bearing 11. The sealing element 21 is mounted to the inner race 11b, preferably by screw fastening. The sealing element 21 and the inner race 11b can also be integrated in one part. In the same way, for example the parts 29 and 30 as well as the parts 12 and 27 can be integrated in one part, but in the presented embodiment, they are separate, particularly to facilitate the manufacture of the coggings. The parts 27 and 28 form a preferably annular packed space for the springs 26.

A protective hollow space 31 is left in the centre of the locking system L, through which it is possible to lead tubes, hoses and wires for electricity and pressurized medium from one frame part to the other in the working machine. The sealing element 21 is not moved in the axial direction, and in the presented advantageous embodiment, it is rotated with the front part 5. The sealing element 21 can also be mounted to the rear part 6, wherein it is rotated with the rear part 6 together with the locking means 12. Thus, the above-described counterforce is exerted by means of the rear part 6 to the outer race 11a, wherein the bearing 11 is subjected to a loading between the inner race 11b and the outer race 11a, caused by the locking. Thus, the cogging 15 can be formed in the sealing element 21 or, for example, the operations of the spring suspension part 28 and the sealing element 21 can be combined at least partly.

It is also obvious that the coggings 13 and 14 can also be tilted in the direction of the longitudinal axis X1, wherein they become conical. Furthermore, it is obvious that the coggings 15 and 16 can also be tilted in the direction of the longitudinal axis X1, wherein the contact between them can be released when the locking means 12 is moved, and wherein they become conical. Thus, also the coggings 15 and 16 are arranged in such a way that they are placed in a contact transmitting the rotational motion at least when the locking means 12 is locked. However, the forces releasing the locking, caused by the profiles of the coggings, can thus be increased, wherein also the required pressure effect must be greater. At the same time, the connecting may take more time and the wear of the coggings is increased. Furthermore, the outer race 11a and the inner race 11b are subjected to a loading caused by diagonal or upright coggings 15 and 16, if the locking means 12 is fastened to the inner race 11b. It is also possible to provide several separate hydraulic spaces 24 between the means 12 and 21, to achieve a sufficient force effect.

Figure 3:
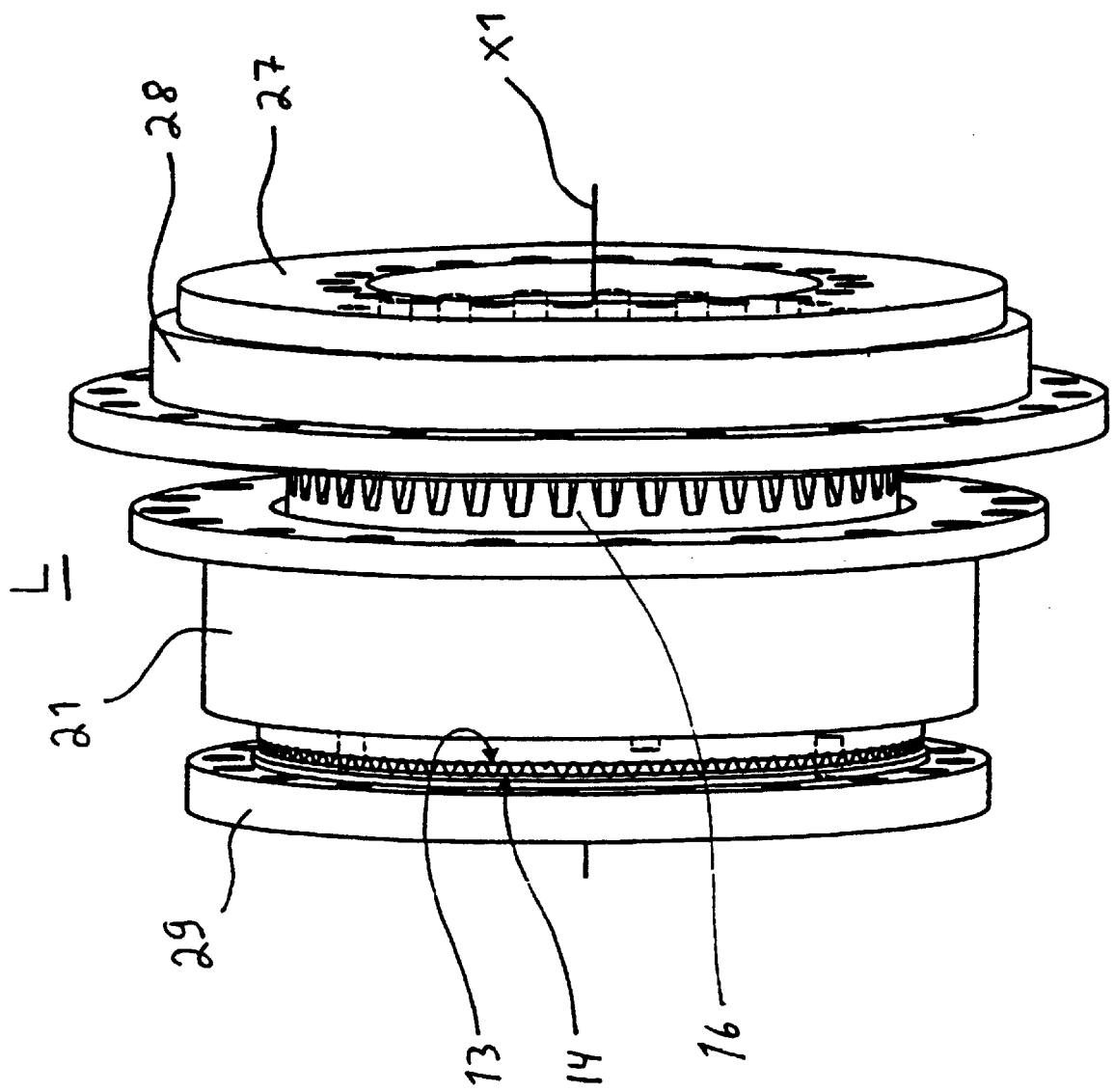
FIG. 3 shows a perspective view of the locking system of FIG. 2, detached from the rotating joint.

FIG. 3 shows the locking system L detached from the rotating joint 1 to illustrate the circumferential and rotationally symmetrical structure of the system. The figure also shows the coggings 13, 14 and 16. The system L is shown in its locked position. The references of FIG. 3 correspond to the references of FIG. 2, and for example the end part 29 is also visible in FIG. 1. It is obvious that the coggings can also consist of one or several arch-like parts of different lengths which only cover a part of the circumference, particularly when the rotational motion of the rotating joint is limited. In the embodiment of FIG. 2, the coggings 15 and 16 can be arch-like. For balanced loading, the separate arch-like parts must be placed symmetrically with respect to the axis X1.

The invention is not limited solely to the above-presented embodiment, but it can be modified within the scope of the appended claims.

What is claimed is:

1. A locking system for a rotating joint, the rotating joint comprising a bearing to be connected between a first frame part and a second frame part in a working machine, to rotate the frame parts with respect to each other around an axial direction, and the locking system being arranged for locking and releasing the rotational motion between the frame parts, wherein the locking system comprises a rigid locking means arranged to be movable in the axial direction and being equipped with:

a first cogging which can be transferred, for locking of the rotational motion, with the locking means to a first contact with a second cogging to transfer the rotational motion, the second cogging being arranged to rotate with the first frame part, wherein said coggings are, for releasing the locking of the rotational motion, designed in such a way that a force effect releasing the first contact is formed therebetween, a third cogging which is, at least during locking of the rotational motion, arranged in a second contact with a fourth cogging to transfer the rotational motion, the fourth cogging being arranged to rotate with the second frame part, wherein said third and fourth coggings are arranged to rotate the locking means with the second frame part around the axial direction, and a sealing element which is arranged to form at least one closed hydraulic space between the locking means and the sealing element, having a volume varying upon the movement of the locking means, wherein a pressurized medium can be conveyed into and from the hydraulic space, wherein the locking means is arranged to be, by the effect of the pressurized medium, transferred to a locking state and to be maintained in the locking state.

2. The locking system according to claim 1, wherein the sealing element is arranged to be rotatable with the first frame part around the axial direction.

3. The locking system according to claim 1, wherein an annular sealing element is arranged a around cylindrical locking means, the means being arranged to be placed centrally inside an annular circumferential bearing used as the bearing.

4. The locking system according to claim 1, wherein the first cogging and the second cogging are substantially radial with respect to the axial direction.

5. The locking system according to claim 1, wherein the third cogging and the fourth cogging are substantially parallel to the axial direction, wherein they are arranged to remain in contact also when the locking means is moved.

6. The locking system according to claim 1, wherein the hydraulic space is annular and centrally placed around the axial direction.

7. The locking system according to claim 1, wherein a slide bearing is arranged between the sealing element and the locking means.

8. The locking system according to claim 1, wherein a sealing for sealing the hydraulic space is arranged between the sealing element and the locking means.

9. The locking system according to claim 1, wherein at least one pressure spring assisting in the releasing of the locking is arranged to be effective on the locking means.

10. The locking system according to claim 1, wherein the fourth an at least one pressure spring assisting in the releasing of the locking of the rotational motion are provided in an annular spring suspension part fitted around the locking means.

* * * * *

UNITED STATES PATENT AND TRADEMARK OFFICE
CERTIFICATE OF CORRECTION

PATENT NO. : 6,742,954 B2
DATED : June 1, 2004
INVENTOR(S) : Hyytiainen Jouko

It is certified that error appears in the above-identified patent and that said Letters Patent is hereby corrected as shown below:

Column 8,
Line 18, "arranged a around" should be -- arranged around a --
Line 44, "fourth an at" should be -- fourth cogging and at --

Signed and Sealed this

Twelfth Day of October, 2004

JON W. DUDAS
*Director of the United States Patent and Trademark Office*